United States Patent [19]
Johnson

[11] Patent Number: 5,103,881
[45] Date of Patent: Apr. 14, 1992

[54] LOG CUTTING APPARATUS

[75] Inventor: Calvin S. Johnson, Union Grove, N.C.

[73] Assignee: CTR Manufacturing, Inc., Union Grove, N.C.

[21] Appl. No.: 719,167

[22] Filed: Jun. 21, 1991

[51] Int. Cl.$^5$ .............................................. A01G 23/08
[52] U.S. Cl. ................................ 144/34 R; 30/383; 30/385; 83/574; 83/820; 144/336
[58] Field of Search ..................... 30/383, 385, 384; 83/574, 820, 928; 144/34 R, 336

[56] References Cited

U.S. PATENT DOCUMENTS

| | | | |
|---|---|---|---|
| 3,565,138 | 2/1971 | Albright . | |
| 3,612,115 | 10/1971 | Albright . | |
| 3,613,923 | 10/1971 | Albright | 214/147 |
| 3,672,412 | 6/1972 | Albright . | |
| 3,796,242 | 3/1974 | Albright | 144/34 R |
| 3,848,648 | 11/1974 | Dika et al. | 144/34 R |
| 3,874,432 | 4/1975 | Albright | 144/34 R |
| 3,881,615 | 5/1975 | Albright | 214/147 |
| 3,905,104 | 9/1975 | Albright | 30/384 |
| 3,946,775 | 3/1976 | Albright | 144/34 R |
| 3,991,799 | 11/1976 | Albright | 144/34 R |
| 4,013,106 | 3/1977 | Albright | 144/34 R |
| 4,050,488 | 9/1977 | Albright | 144/335 |
| 4,053,005 | 10/1977 | Albright | 144/335 |
| 4,161,200 | 7/1979 | Albright | 144/34 R |
| 4,219,058 | 8/1980 | Albright | 144/3 D |
| 4,219,059 | 8/1980 | Albright | 144/34 R |
| 4,462,439 | 7/1984 | Dagenais | 144/34 R |
| 4,763,705 | 8/1988 | Johnson | 144/34 R |
| 4,981,129 | 1/1991 | Osterman et al. | 83/574 |

Primary Examiner—W. Donald Bray
Attorney, Agent, or Firm—Shefte, Pinckney & Sawyer

[57] ABSTRACT

A tree felling apparatus has a U-shaped base with a pair of laterally spaced arms defining a cutting area for receiving therein a tree to be cut and a chain saw mechanism movable through the cutting area for cutting a tree. The chain saw mechanism includes a saw bar which is tapered inwardly from its proximal end to its distal end for even distribution of bending stress across the saw bar.

2 Claims, 4 Drawing Sheets

/ 1

LOG CUTTING APPARATUS

BACKGROUND OF THE INVENTION

The present invention relates generally to the tree harvesting art and, more particularly, to an improved apparatus for cutting logs.

For centuries, trees have been commercially harvested on a mass scale for processing of their wood into all forms of timber, lumber, paper and other derivative products. Historically, the initial operation of felling trees at the harvesting site has been carried out manually and, even today, many tree felling operations are performed utilizing only a manually operated hand-held chain saw mechanism. Over recent years, various forms of automated tree felling apparatus have been developed, typically being adapted for mounting to a conventional off-road commercial vehicle such as a so-called front end loader for ready transportation and operation at a harvesting site. Representative examples of such tree felling apparatus and similar tree harvesting equipment are disclosed in U.S. Pat. Nos. 3,565,138; 3,612,115; 3,613,923; 3,672,412; 3,796,242; 3,874,432; 3,881,615; 3,905,104; 3,946,775; 3,991,799; 4,013,106; 4,050,488; 4,053,005; 4,161,200; 4,219,058; 4,219,059 and 4,763,705.

Conventional log cutting apparatus of this type typically have saw bars which are not tapered, thus maintaining a generally uniform width throughout the length of the saw bar. When the driven saw chain contacts a log to be cut, the resistance of the wood places stress on the saw bar, resulting in a stress pattern emanating from the contact point and distributed generally uniformly in a concentrated region near the contact point. As a result, the saw bar experiences severe localized strain, shortening the life of the metal of which the saw bar is formed. If the tree of log being cut is particularly resistive or heavy, the localized stress could result in catastrophic failure of the saw bar.

SUMMARY OF THE INVENTION

It is accordingly an object of the present invention to provide a log cutting apparatus utilizing a chain saw mechanism having a tapered saw bar which will distribute stress evenly across the saw bar.

Briefly described, the present invention provides an apparatus for cutting logs comprising a base and saw means pivotably mounted to the base, the saw means having a saw bar having a proximal end, a distal end, and an endless saw chain mounted thereto. The apparatus also includes an assembly for driving the saw chain in cutting movement along the saw bar. The saw bar tapers inwardly in the direction away from the proximal end toward the distal end for distributing bending stress evenly across the saw bar.

The drive arrangement includes a drive motor, a driving sprocket located at the proximal end of the saw bar and a pulley sprocket located at the distal end of the saw bar. The drive sprocket is of greater diameter than the pulley sprocket thus providing an increased chain speed with respect to the speed of the drive motor.

DESCRIPTION OF THE PREFERRED EMBODIMENT

Figure 1:
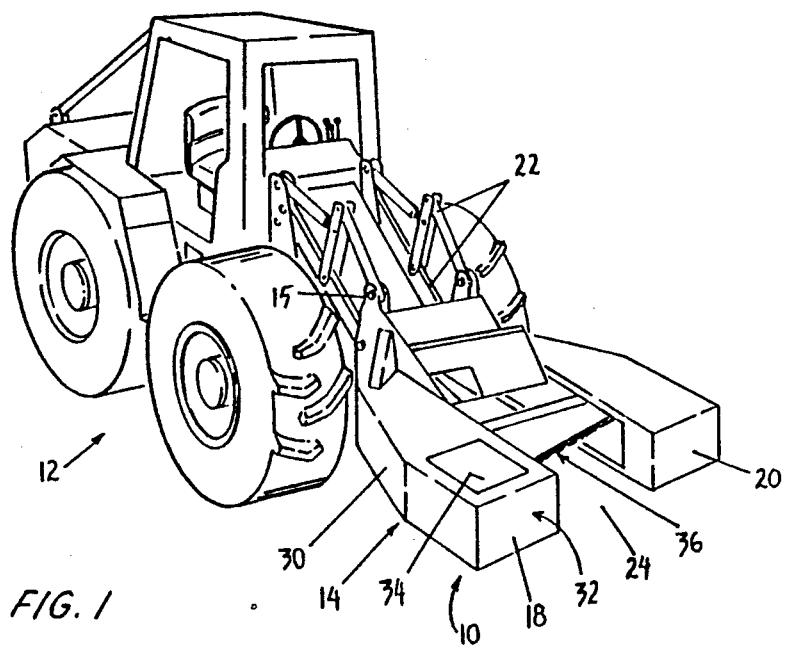
FIG. 1 is a perspective view of the log cutting apparatus of the present invention as preferably embodied in a tree felling apparatus mounted on an off-road vehicle of the front end loader type.

Referring now to FIGS. 1-7, a tree felling apparatus embodying the log cutting apparatus of the present invention is indicated generally at 10 in its preferred embodiment front-mounted to a conventional commercial duty off-road vehicle such as a so-called front end loader, indicated generally at 12, which, as is well known, is provided an auxiliary hydraulic power supply system with multiple hydraulic power take-offs for operating accessory and auxiliary equipment. Of course, as those persons skilled in the art will readily recognize, the present tree felling apparatus 10 is equally well adapted for mounting in association with any other suitable vehicle or power train. Inasmuch as the construction and operation of the front end loader 12 and other similar conventional vehicles and power trains are well known, these matters need not be disclosed herein.

The tree felling apparatus 10 of the present invention includes a substantially U-shaped base structure, indicated generally at 14, having a main body structure 16 from which a pair of laterally spaced arm portions 18, 20 project outwardly in substantially parallel relation to define an open cutting area 24 therebetween. The base structure 14 is pivotably mounted in a generally horizontal disposition by the main body structure 16 in any suitable conventional manner as at 15 to the forwardly projecting forks 22 of the front end loader 12 to facilitate manipulation of the tree felling apparatus 10 by the forks 22 forwardly, rearwardly, vertically and angularly with respect to the main chassis of the front end loader 12 in conventional fashion. In this manner, the base structure 14 may be maneuvered by the front end loader 12 in field cutting operations to position the base structure 14 at the base of the trunk portion of substantially any tree to be felled so as to receive the trunk portion within the open cutting area 24 defined by the base structure 14.

The base structure 14 is preferably fabricated of structural steel plate and beam members welded together to provide satisfactory structural strength, rigidity and stability to withstand rigorous use under typically extreme in-field working conditions. The lowermost region of the base structure 14 is fabricated of vertically spaced upper and lower structural steel plate members 26, 28 of essentially corresponding U-shapes affixed horizontally in substantially parallel superposed relation to one another by welding with a plurality of upright structural steel plate and beam members collectively indicated generally at 30 which extend vertically between the structural members 26, 28 along the rearward and side peripheral extent of the main body structure 16, and along the laterally outward and forwardly facing peripheral extents of the arm portions 18 and 20. In this manner, the lowermost region of the body structure 16 and each arm portion 18, 20 are respectively hollow and open laterally inward to the cutting area 24 defined by the base structure 14. The hollow free end of the arm portion 18 forms a housing 32 for enclosing hydraulic hoses and other control and operating components of the tree felling apparatus 10 as more fully explained hereinafter, the housing 32 including an upwardly facing hinged door 34 to permit access to the housing interior.

A chain saw mechanism, indicated generally at 36, is pivotably supported within the arm portion 18 by a mounting mechanism, indicated generally at 38 (FIGS. 2 and 4), for reciprocating pivotal cutting movement of the chain saw mechanism 36 about a substantially vertical axis in a substantially horizontal path between a retracted position wherein the chain saw mechanism extends from the arm portion 18 toward the main body structure 16 and a cutting position wherein the chain saw mechanism extends from the arm portion 18 through the cutting area 24 to the arm portion 20. The particular construction of the chain sw mechanism 36 is best seen in FIGS. 4, 5, 6 and 7. Basically, the chain saw mechanism 36 includes an elongated planar saw bar or plate 40 with a guard plate 42 affixed in slightly spaced parallel relation to the upper surface of the saw bar 40 at the mounted end thereof, as best seen in FIG. 5. As desired for additional safety, a similar guard plate or plates (not shown) may be affixed to the lower surface of the saw bar 40 as well. The peripheral edges 41 of the saw bar 40 are formed with a continuous recessed groove to accept a conventional saw chain 80 as hereinafter described.

Figure 4:
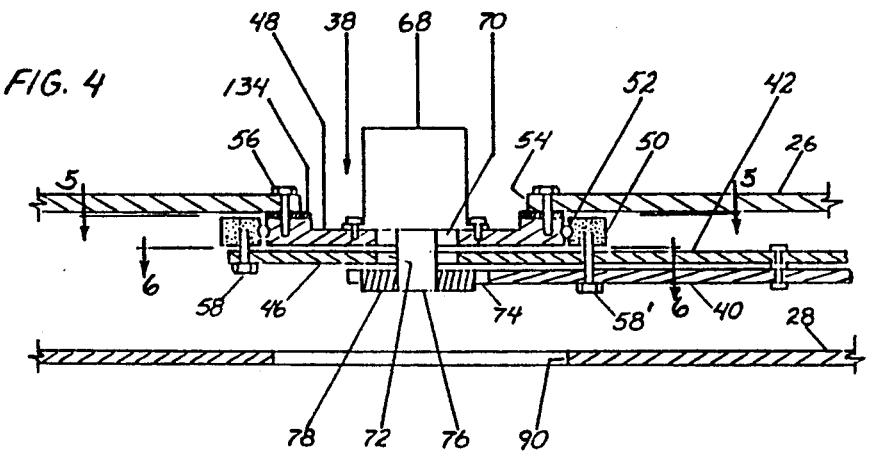
FIG. 4 is a vertical cross-sectional view of the tree felling apparatus of FIG. 1 taken along line 4—4 of FIG. 2.
Figure 5:
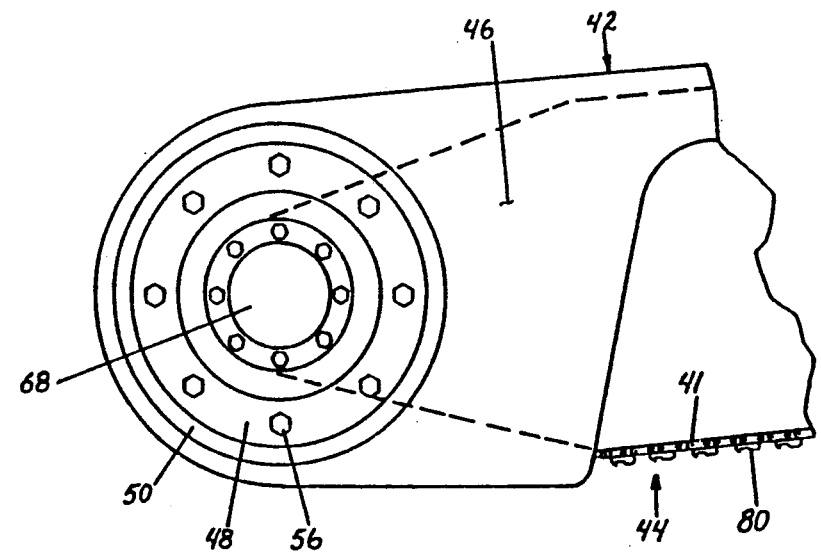
FIG. 5 is a horizontal cross-sectional view of the tree felling apparatus of FIG. 1 taking along line 5—5 of FIG. 4.

The guard plate 42 includes a mounting portion 46 which extends substantially beyond the radially inward end of the saw bar 40 to facilitate pivotal mounting of the chain saw mechanism 36 by the mounting arrangement 38, as will best be understood with reference to FIGS. 4 and 5. The mounting arrangement 38 is a rotational bearing assembly of the type sometimes commonly referred to as a "slewing ring" which basically includes a central circular mounting plate 48 and an annular support ring 50 annularly supported about the periphery of the mounting plate 48 in generally coplanar relation therewith by a ball bearing arrangement 52 disposed annularly intermediate the facing peripheries of the mounting plate 48 and the support ring 50. The upper structural steel plate member 26 of the arm portion 18 is formed with a circular opening 54 coaxial with the desired pivot location of the chain saw mechanism 36 and the mounting plate 48 is affixed to the underside of the structural member 26 of the arm portion 18 concentrically with the opening 54 by a plurality of bolts 56 extending through the structural member 26 at circumferential spacings about the opening 54 into threaded mounting engagement with the mounting plate 48 at corresponding circumferential spacings concentrically thereabout. In turn, the radially inward end of the chain saw mechanism 36 is bolted similarly to the underside of the support ring 50 by a plurality of bolts 58 extending in a circular arrangement through the mounting portion 46 of the guard plate 42 (with some bolts 58′ also extending through the saw bar 40) into threaded mounting engagement circumferentially about the annular support ring 50. As will be understood, the chain saw mechanism 36 is adapted in this manner for pivotal reciprocating movement with respect to the arm portion 18 integrally with the support ring 50 rotationally about the mounting plate 48 which is fixed to the arm portion 18.

Figure 2:
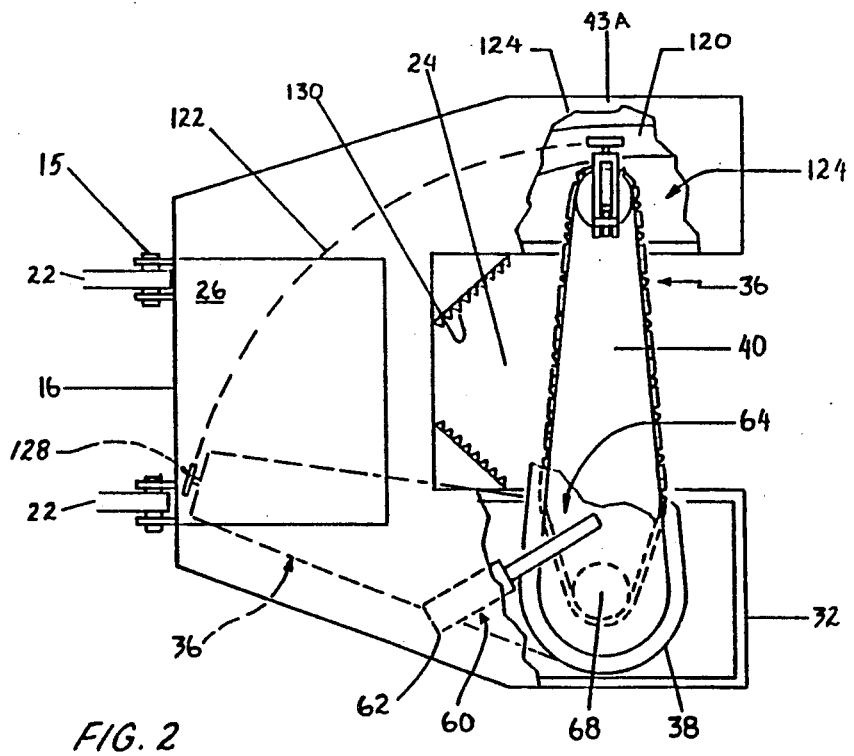
FIG. 2 is a top plan view of the log cutting apparatus of FIG. 1.
Figure 3:
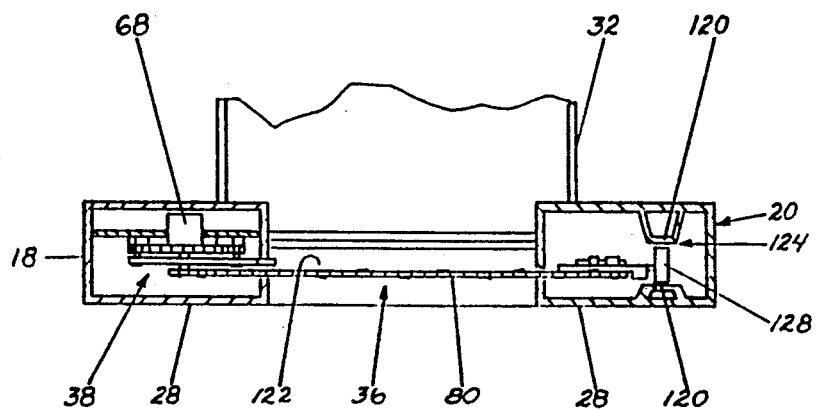
FIG. 3 is a front elevational view of the tree felling apparatus of FIG. 1 with the projecting free ends of the arm portions of the base broken away.

As seen in FIG. 2, a conventional hydraulically operated cylinder and piston assembly 60 is provided to actuate and control the pivotal reciprocating movement of the chain saw mechanism 36. The cylinder and piston assembly 60 includes a cylinder 62 having a closed end pivotally mounted to the base structure 14 and supporting a piston rod 64 for selective extension and retraction of the rod 64 with respect to the cylinder 62. The free end of the piston rod 64 is pivotally connected to the saw bar 40.

The cylinder 60 is suitably connected through hydraulic hoses (not shown) with the auxiliary hydraulic drive system of the front end loader in a conventional manner to permit operator control of the cylinder and piston assembly 60 and the attendant pivotal movement of the chain saw mechanism 36 from the operator compartment of the front end loader 12. In this manner, the chain saw mechanism 36 is arranged for controlled pivotal movement between its aforementioned retracted position extending from the arm portion 18 toward the main body structure 16, as shown in broken lines in FIG. 2, and its aforementioned cutting position extending through the cutting area 24 from the arm portion 18 to the arm portion 20, as shown in full lines in FIG. 2.

Figure 6:
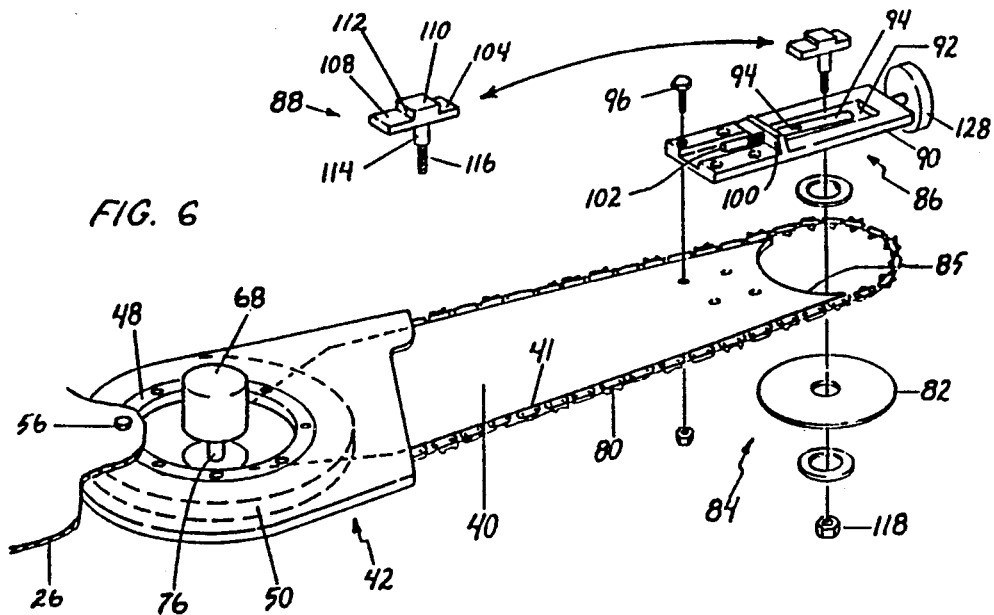
FIG. 6 is a perspective view of the saw means of the tree felling apparatus of FIG. 1, with the chain tensioning arrangement thereof shown in exploded form.
Figure 7:
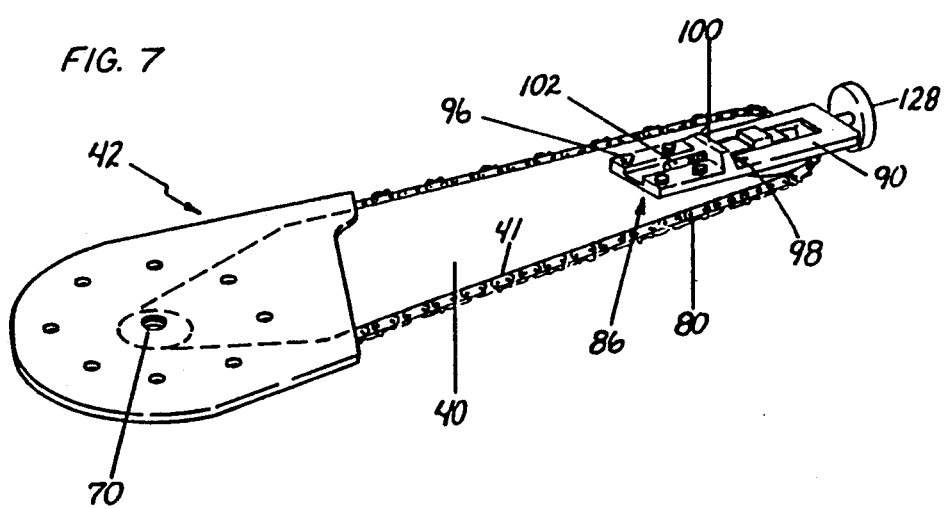
FIG. 7 is a perspective view of the saw means of FIG. 6, with the chain tensioning arrangement shown in its assembled configuration.

As also seen in FIGS. 4-6, in order to similarly provide driving operation and control for the saw chain of the chain saw mechanism 36, a hydraulic motor 68 is fixedly mounted stationarily to the upwardly facing surface of the stationary mounting plate 48 coaxial therewith and in covering relation to a central axial opening 70 therein (best seen in FIGS. 4 and 7). As best seen in FIG. 4, a circular opening 72 is formed in the mounting portion 46 of the upper guard plate 42 of the chain saw mechanism 36 in coaxial alignment with the opening 70 and, similarly, a corresponding coaxially aligned arcuate recessed area 74 is formed in the peripheral edge 41 of the saw bar 40 at its corresponding radially inward end. A drive shaft 76 of the motor 68 extends downwardly coaxially through the aligned openings 70, 72 with its terminal end being located coaxially within the recessed area 74 of the saw bar 40 and a chain drive sprocket 78 is affixed to the depending end of the drive shaft 76 within the recessed area 74 coplanarly with the saw bar 40. In similar manner, a peripherally toothed sprocket, or so-called nose roller, 82 is rotatably supported at the radially outward distal end of the saw bar 40 by a roller adjusting mechanism, generally indicated at 84 in FIGS. 6 and 7, within a similar arcuate recess 85 in the distal end of the saw bar 40 in coplanar relation therewith.

With reference to FIG. 2, the saw bar 40 tapers inwardly from its proximal end toward its distal end. The taper provides an even distribution of bending stress across the saw bar 40. The tapering of the saw bar 40 also allows the chain drive sprocket 78 to be of a substantially greater diameter than the nose roller 82, as seen in FIG. 6. This arrangement allows a greater chain velocity for a given motor speed than would be realized with a smaller diameter chain drive sprocket 78. Additionally, cutting force is increased, being proportional to chain speed. A higher chain speed results in more effective ripping action when the chain contacts wood.

As best seen in FIGS. 5, 6 and 7, a cutting chain 80, which may be of any suitable conventional construction of the type having guide pins projecting inwardly and cutting teeth projecting outwardly from the chain body, is trained in endless fashion about the peripheral edge 41 of the saw bar 40 with the inwardly projecting guide and drive pins in meshing driven engagement with the drive sprocket 78 and the nose roller 82 and in guiding engagement in the peripheral groove of the saw bar 40 along the chain extents between the drive sprocket 78 and the nose roller 82.

According to one feature of the present invention, the roller adjusting mechanism 84 enables adjustment of the tension of the endless saw cutting chain 80. As best seen in FIGS. 6 and 7, the adjusting apparatus 84 basically includes a support member 86 and an adjusting member 88. The support member 86 is formed of an elongate plate 90 having a recessed guide channel 92 extending centrally longitudinally along one surface of the plate and having an elongate throughbore 94 of generally oblong shape extending through the plate 90 along a portion of the length of the guide channel 92, whereby the longitudinal extent of the throughbore 94 is aligned with the longitudinal extent of the guide channel 92. The support member 86 additionally includes a plurality of mounting bolts 96 extending through the support member 86 into threaded mounting engagement with the distal end of the saw bar 40 for fixedly securing the support member 86 to the saw bar 40 at an orientation in which the longitudinal extent of the channel 92 is aligned radially with respect to the drive shaft 76.

The support member 86 also includes a cross piece assembly 98 having a cross bar 100 extending transversely across the guide channel 92 and secured by welding or other appropriate securement means to the upper surface of the plate 90 and an adjustment bolt 102 threadably mounted in a throughbore in the cross bar 100 for axial movement parallel to the longitudinal extent of the guide channel 92 in response to threading and unthreading of the bolt 102 in the cross bar 100.

The adjusting member 88 includes a main body 104 and a nose roller mounting stem 106. The main body 104 has a generally rectangular, parallelipiped base portion 108 compatibly configured for close fitting but freely slidable disposition within the guide channel 92 beneath the cross bar 100 and a raised follower block 110 projecting upwardly from the rectangular base portion 108 and having a cylindrical recess 112 formed in its surface facing the cross bar 100. The nose roller mounting stem 106 includes a cylindrical shaft 116 secured by welding or other appropriate securement means to extend perpendicularly downwardly from the underside of the base portion 108 and the shaft portion 116 having a coaxial collar portion 114 of a larger radius adjacent the base portion 108. The free end of the shaft 116 is threaded to receive a nut 118 thereon. The nose roller mounting stem 106 is adapted to be inserted into the throughbore 94 of the plate 90 with the radius of the collar 114 being selected to be received in close fitting yet freely movable disposition in the throughbore 94 and the axial extent of the collar 114 being selected such that the collar 114 extends beyond the throughbore 94. The nose roller mounting stem 106 rotatably receives the nose roller 84 on its cylindrical shaft 116 between the nut 118 and the collar 114. As can be understood, the guide channel 92, the cross bar 100 and the throughbore 94 cooperate together to constrain the adjusting member 88 to slide along the guide channel 92, with the extent of the sliding being limited by the movement of the collar 114 of the nose roller mounting stem 106 longitudinally within the throughbore 94. The adjacent side edges of the guide channel 92 of the support member 86 and of the base portion 108 of the adjusting member 88 are beveled to restrain the adjusting member 88 against vertical movement out of the guide channel 92.

The support member 86 is mounted to the saw bar 40 at its distal end adjacent the recess 85 for selective adjustment of tension in the cutting chain 80 by threaded movement of the adjusting bolt 102 to selectively actuate movement of the adjusting member 88 toward and away from the drive sprocket 78 at the opposite end of the saw bar 40. Specifically, the cutting chain 80 is tightened as the adjusting member 88 is moved away from the drive sprocket 78 by advancement of the adjustment bolt 102 in the same direction, the bolt 102 engaging the recess 112 of the follower block 110 to advance the adjusting member 88 and prevent its opposing movement in the direction toward the drive sprocket 78. The adjusting member 88 thus maintains the nose roller 82 in an operating position in which it tensions the cutting chain 80 for normal tree cutting movement thereof along the saw bar 40. To adjust the tension of the cutting chain 80, the adjusting member 88 can be selectively moved relative to the support member 86 by threading or unthreading movement of the adjustment bolt 102 within the cross bar 100. As can be understood, as the adjustment bolt 102 is unthreaded, the follower block 104 can be slid along the guide channel 92 toward the drive sprocket 78. The sliding of the follower block 104 moves the nose roller 82 toward the drive sprocket 78 to a service position in which the cutting chain 80 is sufficiently slackened so that the cutting chain 80 can be advantageously demounted from the saw bar 40 in endless form for service, repairs and replacement thereof without the need for breaking or otherwise disconnecting any links thereof.

Once the cutting chain 80 has been serviced, the chain can be remounted into its trained disposition around the drive sprocket 78 and the nose roller 82 and brought into its tensioned disposition for normal tree cutting movement by threading movement of the adjustment bolt 102 in the cross bar 100 to move the nose roller 82 away from the drive sprocket 78.

In the normal cutting movement of the cutting chain 80, operation of the hydraulic motor 68 is effective to actuate cutting movement of the saw chain 80 peripherally about the saw bar 40, the drive sprocket 78 and the nose roller 82, with control of the motor 68 being provided from the operator compartment of the front end loader 12 through suitable hydraulic connections of the motor 68 with the auxiliary hydraulic drive system of the loader 12. Preferably, the motor 68 is operated to rotate its drive shaft 76 and drive sprocket 78 in a counterclockwise direction as viewed in FIGS. 5 and 6 to cause the chain 80 to move in an outward direction along the cutting extent of the saw bar 40 away from the base structure 14 so that during tree cutting operations sawdust, wood chips and the like are expelled outwardly away from the tree felling apparatus 10.

The entire mounting arrangement 38 for the chain saw mechanism 36 is mounted only in depending fashion from the underside of the upper structural steel plate member 26 of the arm portion 18 without any attachment of any of the constituent components to the lower structural steel plate member 28. In this manner, free access to the entire operating extent of the saw chain 80 may be had from the underside of the chain saw mechanism 36 to readily facilitate replacement of the saw chain 88 when necessary as a result of wear or breakage. For this purpose, an access opening may be formed in the lower structural steel plate member 28 immediately below the drive sprocket 78 to permit manual access into the hollow area within the arm portion 18 between the upper and lower members 26, 28.

According to another feature of the present invention, the tree felling apparatus 10 is adapted to limit the deflection of the chain saw mechanism 36 which may be caused by reactive forces exerted by a tree being cut, as will best be understood with reference now to FIGS. 1-3, 6 and 7. As best seen in FIGS. 6 and 7, the overall lateral dimension of the chain saw mechanism 36 gradually reduces from its pivoted end mounted to the arm portion 18 of the base structure 14 to the outward distal end of the chain saw mechanism, i.e. the chain saw mechanism 36 tapers inwardly in its lateral extent in the direction from the radially inward end of the saw bar 40 to the distal radially outwardmost end of the saw bar 40. In this manner, the chain saw mechanism is better capable of bearing and distributing deflecting forces exerted thereon during tree cutting operations. Within the hollow interior of the arm portion 20 of the base structure 14, the arm portion 20 includes saw tracking members 120 which project toward one another from the upper and lower structural members 26, 28 of the arm portion 20 for defining a tracking area 124 relatively closely corresponding to the vertical dimension of a guide portion such as a roller 128 (hereinafter described), mounted at the distal end portion of the chain saw mechanism 35 for confined receipt of the roller 128 during tree cutting movement thereof to limit deflection of the chain saw mechanism 36 during the latter stages of tree cutting movement, preferably no more than approximately one-fourth of an inch of deflection during tree cutting movement. Moreover, the extent of the upper and lower structural steel plate members 26, 28 along the main body structure 16 includes a pair of saw tracking members (not shown) which project toward one another from the upper and lower structural members of the main body structure 16 and define a travel area 122 for travel therein of the distal end portion of the chain saw mechanism 36 during the initial stages of tree cutting movement from its retracted position. Each respective saw tracking member in the main body structure 16 merges with the corresponding saw tracking member 120 in the arm portion 20, whereby the travel area 122 is merged with the tracking area 124 defined by the saw tracking members 120 to insure that the distal end of chain saw mechanism 36 is prevented from damaging deflection throughout the full range of its cutting movement.

To facilitate smooth travel of the distal end portion of the chain saw mechanism 36 along the travel area 122 of the main body structure 16 and the tracking area 124 of the arm portion 20, the aforementioned guide roller 128 may be rotatably mounted to the plate 90 of the chain saw mechanism 36 for rotation along the lower saw tracking member of the main body portion 16 and the arm portion 20 during travel of the chain saw mechanism 36 between its retracted position and its cutting position.

To further assist in stabilizing the base structure 14 against reactive forces exerted by the tree being cut, the lower structural steel plate member 28 is preferably formed with serrations 130, 132 (FIG. 2) or similar teeth-like projections along its edge facing inwardly of the cutting area 24 at the juncture between the main body structure 16 and the arm portion 20 so as to penetratingly engage the trunk portion of the tree being cut in order to retain the overall base structure 14 substantially stationary with respect to the trunk portion. Additionally, a conventional hydraulically activated pair of opposed jaw members (not shown) can be provided to grasp the tree at a horizontal plane along the cutting area 24.

According to another feature of the present invention and as best shown in FIG. 4, the tree felling apparatus 10 is also provided with a resilient member 134, such as, for example, an annular elastomeric ring, which is disposed between the mounting plate 48 of the slewing ring 38 and the upper structural steel plate member 26. Upon mounting of the mounting plate 48 to the plate member 26, the mounting bolts 56 are tightened to compress the resilient member 134 to approximately one-half of its relaxed thickness. The resilient member 134 resiliently absorbs compression and tensile forces exerted thereon due to relative movement between the slewing ring 38 and the upper structural steel plate member 26. Relative movement between the slewing ring 38 and the upper structural steel plate member 26 occurs when the saw bar 40 is deflected from the plane, transverse to the axis of the hydraulic motor 68, through which the saw bar 40 normally travels as it cuts a tree. Deflection of the saw bar 40 can occur, for example, if the chain saw mechanism 36 is subjected to a reactive force caused by a tree being cut, whereupon the resilient member 134 absorbs the forces transmitted by the slewing ring 38 of the chain saw mechanism 36 and suppresses or prevents transmission of these forces to the upper structural steel plate member 26, thereby further reliving deflecting forces extended on the chain saw mechanism 36.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for cutting logs comprising a base and saw means pivotally mounted to said base, said saw means having a saw bar having a proximal end about which said saw means pivots, a distal end which is remote from said proximal end, and an endless saw chain mounted to said saw bar, and means for driving said saw chain in cutting movement along said saw bar, said saw bar being of a decreasing transverse dimension in the direction away from said proximal end toward said distal end for distributing bending stress evenly across said saw bar.

2. An apparatus for cutting wood according to claim 1 wherein said drive means includes a drive motor, a driving sprocket at said proximal end of said bar and a pulley sprocket at said distal end, said drive sprocket being of greater diameter than said pulley sprocket, thus providing an increased chain speed with respect to the speed of said drive motor.

* * * * *